US006286011B1

(12) United States Patent
Velamuri et al.

(10) Patent No.: US 6,286,011 B1
(45) Date of Patent: *Sep. 4, 2001

(54) SYSTEM AND METHOD FOR RECORDING TRANSACTIONS USING A CHRONOLOGICAL LIST SUPERIMPOSED ON AN INDEXED LIST

(75) Inventors: Syama S. Velamuri, Dunwoody; Julia Torbert, Stone Mountain; Prasad Nimmagadda, Norcross, all of GA (US)

(73) Assignee: BellSouth Corporation, Atlanta, GA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/846,576

(22) Filed: Apr. 30, 1997

(51) Int. Cl.$^7$ .................................................. G06F 9/00

(52) U.S. Cl. ............................. 707/104; 707/10; 707/9

(58) Field of Search ........................................... 707/1–206

(56) References Cited

U.S. PATENT DOCUMENTS

| | | | |
|---|---|---|---|
| 5,204,958 | * | 4/1993 | Cheng et al. .......................... 707/100 |
| 5,283,894 | * | 2/1994 | Deran ..................................... 707/100 |
| 5,430,719 | | 7/1995 | Weisser, Jr. . |
| 5,832,508 | * | 11/1998 | Sherman et al. ..................... 707/200 |

FOREIGN PATENT DOCUMENTS

| | | |
|---|---|---|
| 0350918A | 1/1990 | (EP) . |
| 0750434A | 12/1996 | (EP) . |
| 0751691A | 1/1997 | (EP) . |

* cited by examiner

Primary Examiner—Thomas Black
Assistant Examiner—John G. Mills
(74) Attorney, Agent, or Firm—Christopher J. Chan; Kilpatrick Stockton (57) ABSTRACT

Recording transactions using a chronological list superimposed on an indexed list. A transaction log of transaction entries is maintained as a data structure logically organized as a chronological list superimposed on an indexed list. In one aspect of the invention, the transaction log is implemented in an element of a telecommunications network. In another aspect of the invention, the transaction log is implemented in a computer system. Preferably, each transaction entry includes a transaction identifier field, a time stamp field, a chronological list pointer field and an indexed list pointer field. A first chronological list pointer points to the oldest transaction entry in the transaction log and a last chronological list pointer points to the latest transaction entry in the transaction log. The chronological list pointer field of a transaction entry points to the next oldest transaction entry. The indexed list includes a number of indexed list entry pointers. Each indexed list entry pointer corresponds to an index and points to a transaction entry with the same index. The indexed list pointer field of a transaction entry points to another transaction entry with the same index. Adding a transaction entry to the transaction log or deleting a transaction entry from the transaction log includes updating the chronological list pointers and the indexed list pointers.

10 Claims, 9 Drawing Sheets

| 302 Transaction Descriptor | 304 Time Stamp | 306 Chronological List Pointer | 308 Indexed List Pointer |
|---|---|---|---|

SYSTEM AND METHOD FOR RECORDING TRANSACTIONS USING A CHRONOLOGICAL LIST SUPERIMPOSED ON AN INDEXED LIST

FIELD OF THE INVENTION

This invention relates in general to recording transactions in a transaction log, and more particularly to recording transactions in a transaction log using a chronological list superimposed on an indexed list.

BACKGROUND OF THE INVENTION

The telecommunications industry is on the verge of a major change in the way local telephone service is provided. Traditionally, a single service provider provided local service for all telephone subscribers within a local market. However, under the 1996 Telecommunications Act, multiple service providers may operate within a local market and compete for local subscribers. In the competition for local subscribers, the existing service provider has an advantage over other service providers if local telephone subscribers must change telephone numbers to change service providers. To eliminate any advantage that the existing local service provider may have due to a subscriber's reluctance to change telephone numbers, a local telephone subscriber is permitted to keep an existing telephone number even though the subscriber changes service providers. Local Number Portability ("LNP") is the mechanism which allows a local telephone subscriber to keep an existing telephone number even though the subscriber changes local service providers.

Currently, each subscriber telephone line is assigned a directory number or telephone number. A directory number is the number that is dialed or input by a calling party to place a telephone call. Each directory number in the United States includes ten digits (e.g. 404-222-2500). A directory number contains a three digit area code ("NPA") followed by a three digit exchange code ("NXX"). The first six digits of a directory number are referred to as the "NPA-NXX." For example, there are 10,000 directory numbers that start with the NPA-NXX 404-222 (i.e., 404-222-0001, 404-222-0002, etc.).

In a non-LNP enabled telecommunications network, each NPA-NXX is typically assigned to a single switch. However, in an LNP enabled telecommunications network, an NPA-NXX is no longer assigned to a single switch. A directory number may be "ported" to a switch served by a different service provider so the NPA-NXX of a directory number no longer uniquely identifies a switch. Traditional telephone routing procedures assume that the NPA-NXX of a directory number uniquely identifies a switch. To accommodate LNP, new telephone routing procedures are needed because the NPA-NXX of a directory number no longer uniquely identifies a switch.

To route a telephone call in an LNP enabled telecommunications network, the originating switch may refer to an LNP database to determine which switch serves a particular directory number. The LNP database includes a list of directory numbers and corresponding Local Routing Numbers ("LRN"). An LRN identifies the switch which serves the directory number. Each local service provider may maintain its own LNP database. For example, if a telephone call is placed from a directory number in Network A to a directory number in Network B, the originating switch in Network A refers to an LNP database in Network A to determine where the call should be routed. The LNP database includes an entry for the called directory number which indicates that the directory number is served by a switch in Network B. Therefore, the originating switch in Network A routes the telephone call to a switch in Network B.

When a subscriber changes local service providers, the subscriber's directory number is ported to a network managed by a different local service provider. To reflect the change, the local service providers must update their respective LNP databases with network information for the new local service provider. Ideally, all of the LNP databases are updated simultaneously so that calls to the subscriber's directory number are properly routed after the change in service providers. However, in reality, there is a delay between updates because the updates are performed independently by each local service provider. If the LNP databases are not updated simultaneously, then a non-call associated message may "loop" between local service provider networks, i.e., the message may be routed between the networks in a loop until both LNP databases are updated.

For example, looping may occur if a subscriber moves from local service provider A to local service provider B and the LNP databases are not all updated when a CLASS (Custom Local Area Signaling Services) service such as the "Repeat Dialing" service is invoked for the subscriber's directory number. Prior to the move, the LNP database for local service provider A and the LNP database for local service provider B both indicate that the subscriber's directory number is served by a switch in Network A. After the move, local service provider A updates its LNP database to indicate that the subscriber's directory number is served by a switch in Network B. However, local service provider B does not immediately update its LNP database so its LNP database still indicates that the customer's number is served by a switch in Network A.

If the subscriber's directory number is initially busy, Repeat Dialing may be invoked to monitor the directory number to determine when the directory number is available. Once the subscriber's directory number is available, the call may be completed. Non-call associated messages are used to monitor the status of the subscriber's directory number. Some of the messages require Global Title Translation ("GTT"). If the call to the subscriber's directory number originates in Network A, the Network A switch queries the LNP database of Network A to determine which switch serves the directory number. The LNP database of Network A indicates that a switch in Network B serves the directory number, so Network A sends a message to Network B to determine the status of the called number. When Network B receives the message, the LNP database of Network B is queried to determine which switch serves the directory number. The LNP database of Network B indicates that the message should be routed to a switch in Network A so Network B sends the message back to Network A. The message continues to loop between Network A and Network B until the LNP database of Network B is updated. Looping may also occur if there is an error in one of the LNP databases. An error may arise from a human error or a processing error.

Looping is a problem because a looping message consumes network resources and negatively impacts network performance and reliability. Looping messages also create an overload condition on the network, causing legitimate calls to fail. Several solutions have been proposed to solve the looping problem. One proposed solution involves marking a message with a "dirty" bit. A dirty bit is set by the originating network before the message is sent. The originating network checks the dirty bit for each message it receives from another network. If the dirty bit is set, then the originating network detects a loop. A disadvantage of the dirty bit proposal is that the dirty bit must be preserved by all local service providers. However, there is no provision for a dirty bit in the existing message routing protocol, so there is no guarantee that the dirty bit will be preserved.

Another proposed solution is "gateway screening". This solution requires that a network screen messages received from other networks to detect a looping message. A message received from another network is screened to determine whether the message originated in the network receiving the message. If the message originated in the network receiving the message, then the message is dropped. A disadvantage of this solution is that it will only detect loops involving an originating network. If a loop occurs between two non-originating networks, it is not detected.

A third proposed solution is transaction ID logging. Transaction ID logging maintains a log of messages recently sent to other networks and compares a message received from another network to the message log. If the received message matches a message in the log, a loop is detected. The log is maintained so that it only contains messages sent within a predetermined period of time. An advantage of transaction ID logging is that it is a self-sufficient solution. Transaction ID logging may be implemented by one local service provider regardless of whether other local service providers implement it. Another advantage is that it works with existing message protocols.

Although transaction ID logging is theoretically appealing, it has not been previously implemented because of concerns that it would adversely impact network performance. The Illinois Commerce Commission ("ICC"), a group formed to study message looping in LNP enabled telecommunications networks and to provide recommended solutions, considered but did not pursue transaction ID logging. The IIC Subcommittee concluded that transaction ID logging was too processor intensive, and therefore, did not pursue transaction ID logging.

Accordingly, there is a need in the art for an implementation of transaction ID logging in which the time to compare a new transaction to the existing transaction entries in the transaction log is minimized. There is also a need in the art for an implementation of transaction ID logging in which the time to maintain a transaction log is minimized.

SUMMARY OF THE INVENTION

The present invention satisfies the above-described needs by using a chronological list superimposed on an indexed list to implement transaction ID logging. The chronological list expedites maintaining the log and the indexed list expedites searching the log. In an LNP enabled telecommunications network, the present invention may be used to detect messages looping between networks. Generally described, the present invention provides a system and method for recording transactions, such as non-call associated messages, in a transaction log using a chronological list superimposed on an indexed list. A transaction log includes a number of transaction entries. Each transaction entry corresponds to a previous transaction. When a new transaction is received, the new transaction is compared to the existing transactions in the transaction log. If a match is detected between the new transaction and an existing transaction, a loop is detected. Once a transaction loop is detected, appropriate action may be taken to break the loop. To ensure that a valid subsequent transaction is not detected as a looping transaction, stale transaction entries are deleted from the transaction log. Typically, a transaction entry is stale if it has been in the transaction log longer than a predetermined maintenance period.

A transaction entry typically includes a transaction descriptor field, a time stamp field, a chronological list pointer field and an indexed list pointer field. The transaction descriptor field contains a transaction descriptor which identifies the transaction and other transaction information. The time stamp field contains a time stamp indicating when the transaction was initiated. The chronological list pointer field may contain a chronological list pointer pointing to the next oldest transaction entry. The indexed list pointer field may contain an indexed list pointer pointing to another transaction entry with the same index.

Each transaction entry in the transaction log is placed in both the chronological list and the indexed list. The chronological list orders the transaction entries from the oldest transaction entry to the latest transaction entry. Chronological list pointers are associated with the transaction entries in the chronological list. For example, a first chronological list pointer points to the oldest transaction entry and a last chronological list pointer points to the latest transaction entry. The order of the remaining transaction entries in the chronological list is maintained using chronological list pointers. A chronological list pointer links a transaction entry to the next oldest transaction entry. The chronological list minimizes the time needed to identify and delete a stale transaction entry.

The indexed list is a list of indexed list entry pointers. Each indexed list entry pointer corresponds to an index and points to a transaction entry with the same index. The index for a transaction entry may be determined by hashing the transaction descriptor for the transaction entry. If there is more than one transaction entry with the same index, then the transaction entries are linked together via the indexed list pointer fields of the transaction entries. For example, if there are two transaction entries with the same index, then the indexed list entry pointer points to the first transaction entry and the indexed list pointer field of the first transaction entry points to the next transaction entry. The indexed list reduces the number of transaction entries which must be searched to determine whether there is a match between a new transaction and an existing transaction. Reducing the number of transaction entries minimizes the time needed to compare a new transaction with an existing transaction.

To maintain the transaction log, the transaction entries are checked to determine whether any of the transaction entries have been stored in the transaction log for longer than the predetermined maintenance period. The first chronological list pointer is used to identify the oldest transaction entry in the transaction log. The time stamp field of the oldest transaction entry is checked to determine whether the transaction entry is stale. If the oldest transaction entry is stale, then the transaction entry is deleted from the chronological list and the indexed list. To delete the oldest transaction entry from the chronological list, the first chronological pointer is updated to point to the next oldest transaction entry. To delete the oldest transaction entry from the indexed list, the indexed list entry pointer corresponding to the oldest transaction entry is updated. If the indexed list entry pointer field of the oldest transaction entry contains an end of list indicator, then there are no other transaction entries with the same index and the indexed list entry pointer is updated to contain an end of list indicator. If the indexed list entry pointer field of the oldest transaction entry contains a pointer to another transaction entry, then the indexed list entry pointer is updated to point to that transaction entry.

To compare a new transaction with the existing transactions in the transaction log, the index for the new transaction is calculated. The index identifies an indexed list entry pointer corresponding to the index. If there is no transaction entry which corresponds to the index, then the indexed list entry pointer contains an end of list indicator. Otherwise, the indexed list entry pointer contains a pointer to a transaction entry corresponding to the index. If there is more than one transaction entry corresponding to the index, then the indexed list pointer field of the transaction entry corresponding to the index contains a pointer to another transaction entry. Once the transaction entries corresponding to the index are identified, the transaction information for each transaction entry is compared to the transaction information for the new transaction. If there is a match, then a loop is detected. If there is no match, a new transaction entry is created for the new transaction and the new transaction entry is added to the transaction log.

To add a new transaction entry to the transaction log, the last chronological list pointer is updated to point to the new transaction entry. The chronological list pointer field of the transaction entry previously pointed to by the last chronological list pointer is updated to point to the new transaction entry. If the indexed list entry pointer corresponding to the index for the new transaction contains an end of list indicator, the indexed list entry pointer is updated to point to the new transaction entry. Otherwise, the indexed list pointer field of the last transaction entry corresponding to the index is updated to point to the new transaction identifier.

Using a chronological list superimposed on an indexed list, solves the problems of quickly maintaining and searching the transaction log. The chronological list minimizes the time required to identify and delete the oldest transaction entries. There is no need to search the entire transaction log to locate the oldest transaction entry because the first chronological list pointer points to the oldest transaction entry. Similarly, only those transaction entries with the same index as the new transaction are searched to determine if a new transaction matches an existing transaction in the transaction log. The search time is minimized because only those transaction entries with the same index are searched.

These and other aspects, features and advantages of the present invention may be more clearly understood and appreciated from a review of the following detailed description of the disclosed embodiments and by reference to the appended drawings and claims.

DETAILED DESCRIPTION

The present invention is directed toward a system and method for recording transactions in a transaction log using a chronological list superimposed on an indexed list. In one embodiment, the present invention may be used to implement transaction ID logging in an LNP enabled telecommunications network. Briefly described, a log of messages recently sent to other networks is maintained in a chronological list and in an indexed list. Each time a message is received from another network, the message is compared to the existing messages in the transaction log. If the message matches an existing message in the transaction log, then a loop is detected. The chronological list is used to detect and delete stale transaction entries. The indexed list is used to compare a new message to the existing messages in the transaction log. The use of a chronological list superimposed on an indexed list implements transaction ID logging without adversely impacting network performance.

Exemplary Telecommunications Operating Environment

Figure 1:
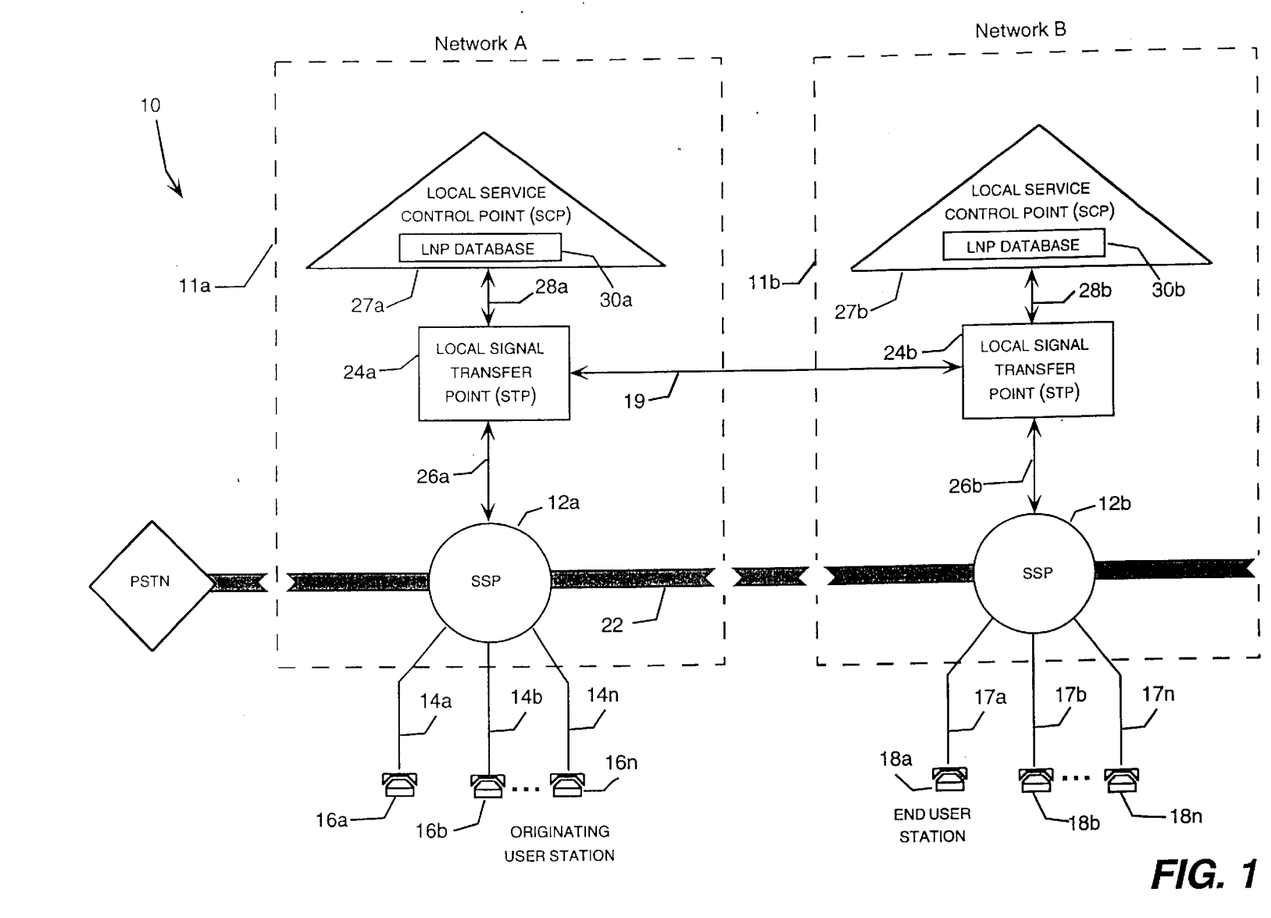
FIG. 1 is a block diagram of two switched telephone networks illustrating the operating environment for an exemplary embodiment of the present invention.

FIG. 1 is a functional block diagram that illustrates a portion of a public switched telecommunications network ("PSTN") 10 configured for LNP. Two Advanced Intelligent Networks ("AIN's") 11a and 11b represent the LNP-enabled portion of the PSTN 10. Although FIG. 1 illustrates two networks in the LNP-enabled portion of the PSTN 10, additional networks for additional local service providers may exist. Although FIG. 1 shows both networks as AIN'S, a network is not necessarily implemented as an AIN. An AIN is well-known to those skilled in the art and is described in the commonly-assigned patent to Weisser, Jr., U.S. Pat. No. 5,430,719, which is incorporated herein by reference.

The AIN's 11a and 11b may include a plurality of central office switches (not shown). Some of the central office switches are equipped with service switching points ("SSP's"). Representative SSP's 12a and 12b are shown in FIG. 1. An SSP (specifically, a Class 5 central office switch) is the AIN component of a typical electronic central office switch used by a local exchange carrier. The terms "SSP" and "switch" are used interchangeably herein to refer to a telecommunications switch for connecting voice-channel circuits, including voice-channel lines. In FIG. 1, the voice-channel lines for SSP 12a and SSP 12b are respectively 14a–n and 17a–n.

The switches of AIN's 11a and 11b are interconnected by a network of high capacity voice-channel circuits known as trunks 22. Each switch of an AIN is operable for receiving a communication, such as a telephone call, originating on a line serviced by the switch, and for routing the telephone call to the correct terminating station. In FIG. 1, the terminating equipment is represented by telephones, 16a–n and 18a–n. Although telephones are illustrated in FIG. 1 as the pieces of terminating equipment, terminating equipment may include other communication devices, such as wireless telephones, facsimile machines, computers, modems, etc.

Each switch in an AIN is connected to a local signal transfer point ("STP") via a data link. In FIG. 1, switch 12a is connected to STP 24a by data link 26a and switch 12b is connected to STP 24b by data link 26b. The STP's 24a and 24b are multi-port, high-speed packet switches that are programmed to respond to the routing information and route a packet to its destination. STP 24a of Network A is connected to STP 24b of Network B via a Signaling System 7 ("SS7") data link 19.

Much of the intelligence of an AIN resides in a plurality of local service control points ("SCP's"), represented by SCP 27a and SCP 27b in FIG. 1. SCP 27a is connected to STP 24a by an SS7 data link 28a and SCP 27b is connected to STP 24b by an SS7 data link 28b. An SCP is a remotely programmable intelligent network element. As is known to those skilled in the art, SCP's are physically implemented by relatively powerful fault tolerant computers. As shown in FIG. 1, an LNP database may be located in an SCP. An LNP database includes a look-up table that cross-references ported directory numbers to Local Routing Numbers ("LRN"). An LRN identifies the switch which serves the ported directory number. Each local service provider may maintain its own LNP database. Alternatively, if future implementations of an STP or an SSP contain sufficient memory, an LNP database may be located in an STP or an SSP.

An SSP may be configured to interface with the intelligent network elements of the AIN through the use of a "trigger." In general, a trigger is defined by a predetermined set of conditions and serves as an indicator for the SSP to take certain action. For example, in response to a trigger, an SSP 12a may create a digital data message for transmission over the network of digital data links 26a and 28a. The SSP typically holds the communication until the SSP receives a reply to its message from an appropriate network element, such as an SCP, instructing the SSP to take a certain action. If the SSP receives no instructions within a certain amount of time, the SSP "times-out" and executes a default task for the communication. For more information regarding the AIN protocol, see Bellcore Specification TR-NWT-001284 Switching Systems Generic Requirements for AIN 0.1, incorporated herein by reference.

The message created by an SSP in response to a trigger is known as a "query" message. A query message opens a "transaction" and the SSP generally holds the communication while the transaction remains open. The reply to the query message may be a "conversation" message or a "response" message. Conversation messages allow for bi-directional exchanges between network elements while the transaction remains open. A "response" message closes the transaction opened by the query message, and usually instructs the SSP to route the held communication for connection with a terminating station. A trigger may be activated or deactivated at an SSP by another network element through an "update" message. Query messages, conversation messages, response messages, and update messages are standard types of messages defined by the AIN protocol. The details of the AIN protocol are well known to those skilled in the art and will not be further described herein. For more information regarding the AIN protocol, see Bellcore Specification TR-NWT-001284 Switching Systems Generic Requirements for AIN 0.1, referenced above.

FIG. 1 may be used to illustrate non-call associated message routing in an LNP enabled telecommunications network. In this example, SSP 12a detects a trigger from originating user station 16n in Network A. The trigger causes SSP 12a to open a transaction and to formulate a message to check the status of the directory number at end user station 18a in Network B. Additional messages to check the status of a called directory number may occur if the Repeat Dialing service is invoked. Some of the messages associated with a CLASS service such as the Repeat Dialing Service may require GTT. To route a message requiring GTT from Network A, STP 24a accesses the LNP database 30a of SCP 27a to determine where the message should be routed. In this example, LNP database 30a indicates that the message should be routed to Network B so SCP 27a instructs STP 24a to route the query message to Network B via the SS7 data link 19. When Network B receives the message, STP 24b accesses the LNP database 30b of SCP 27b to determine whether the message concerns a directory number served by a Network B switch. In this example, LNP database 30b indicates that the message concerns a directory number served by a Network B switch, so SCP 27b instructs STP 24b to check the status of the directory number at SSP 12b for the end user station 18a.

To illustrate message looping in an LNP enabled telecommunications network, consider the same trigger scenario. However, in this example, the directory number has been recently ported from Network A to Network B. The LNP database of Network A is updated to reflect the porting of the directory number to Network B, but the LNP database of Network B still indicates that the directory number is served by Network A. To route a message requiring GTT from Network A, STP 24a accesses LNP database 30a of SCP 27a to determine where the message should be routed. As before, LNP database 30a indicates that the message should be routed to Network B so SCP 27a instructs STP 24a to route the message to Network B via the SS7 data link 19. When Network B receives the message, STP 24b accesses the LNP database 30b of SCP 27b to determine whether the message concerns a directory number served by a Network B switch. In this example, the LNP database 30b has not been updated, so the LNP database 30b indicates that the message concerns a directory number served by a Network A switch. SCP 27b instructs STP 24b to route the message to Network A. When Network A receives the message, STP 24a accesses the LNP database 30a of SCP 27a to determine whether the message concerns a switch in Network A. LNP database 30a indicates that the message concerns a switch in Network B so the message is routed back to Network B. The message continues to loop between Network A and Network B until the LNP database of Network B is updated.

Although message looping has been illustrated using the Repeat Dialing service, those skilled in the art will appreciate that message looping may occur in other situations. Message looping may occur whenever GTT is performed for messages such as Transaction Capabilities Applications Protocol ("TCAP") messages in an LNP enabled telecommunications network.

Finally, note that FIG. 1 illustrates a conventional land-line telecommunications system. For simplicity, the disclosed embodiment of the present invention is described in the context of this conventional land-line telecommunications system. It should be understood, however, that alternative embodiments of the present invention may operate in association with cellular or other wireless telecommunications systems.

Exemplary Computer Operating Environment

Figure 2:
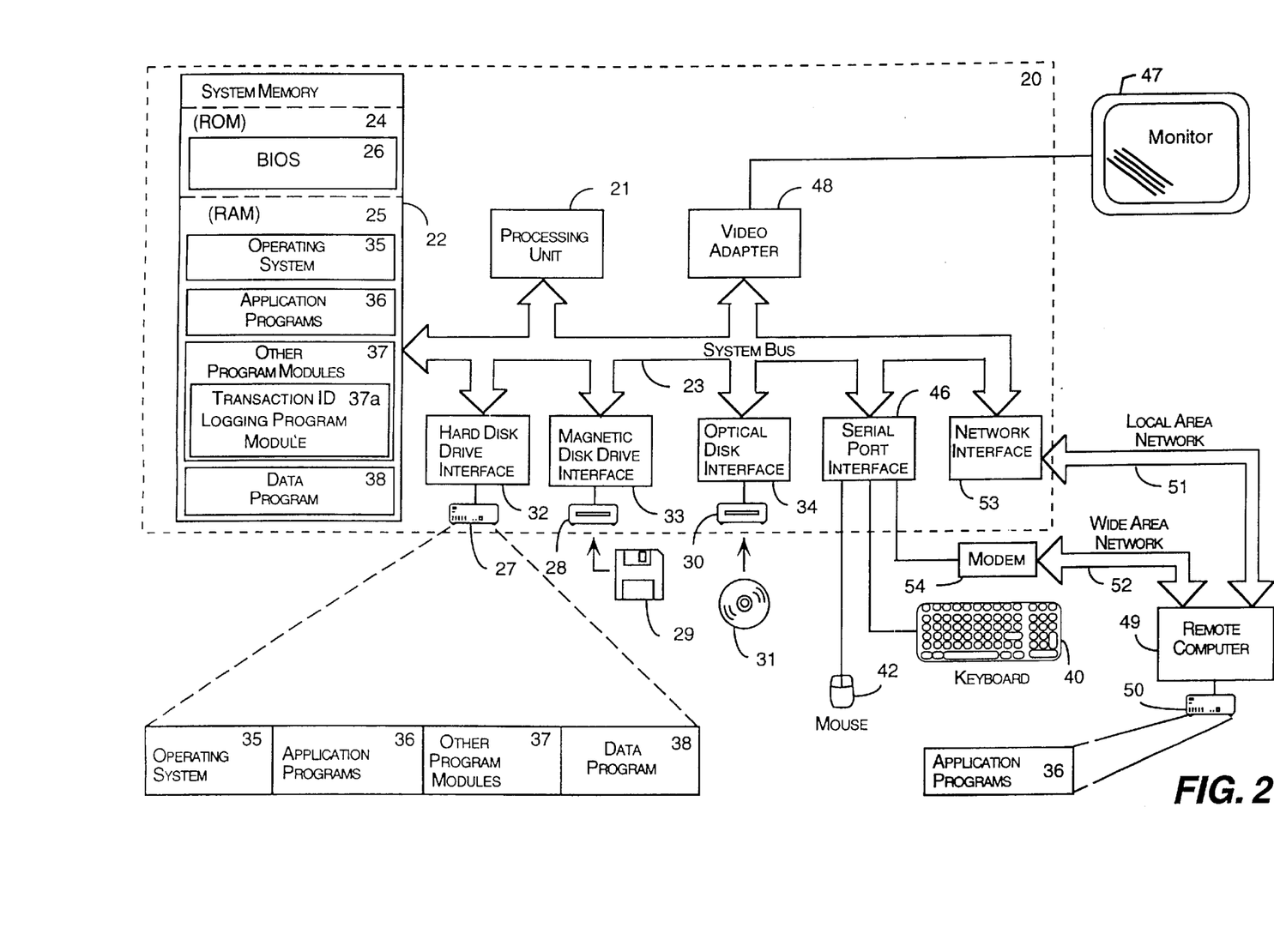
FIG. 2 is a block diagram of a computer illustrating the operating environment for an exemplary embodiment of the present invention.

Another embodiment of the present invention may be implemented in a computer system. The embodiment may be used to record transactions or other data in a log so that the log may be quickly searched and maintained. FIG. 2 and the following discussion provide a brief, general description of a suitable computing environment for the invention. Those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 2, an exemplary computer system for implementing an embodiment of the invention includes a conventional personal computer 220, including a processing unit 221, a system memory 222, and a system bus 223 that couples the system memory to the processing unit 221. The personal computer 220 further includes a hard disk drive 227, a magnetic disk drive 228, e.g., to read from or write to a removable disk 229, and an optical disk drive 230, e.g., for reading a CD-ROM disk 231 or to read from or write to other optical media. The hard disk drive 227, magnetic disk drive 228, and optical disk drive 230 are connected to the system bus 223 by a hard disk drive interface 232, a magnetic disk drive interface 233, and an optical drive interface 234, respectively. The drives and their associated computer-readable media provide nonvolatile storage for the personal computer 220. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 225, including an operating system 235, one or more application programs 236, other program modules 237, such as a transaction ID logging program module 237a, and program data 238. A user may enter commands and information into the personal computer 220 through a keyboard 240 and pointing device, such as a mouse 242. Other input devices (not shown) may include a microphone, joystick, game pad, satellite dish, scanner, or the like. These and other input devices are often connected to the processing unit 221 through a serial port interface 246 that is coupled to the system bus, but may be connected by other interfaces, such as a game port or a universal serial bus (USB). A monitor 247 or other type of display device is also connected to the system bus 223 via an interface, such as a video adapter 248. In addition to the monitor, personal computers typically include other peripheral output devices (not shown), such as speakers or printers.

The personal computer 220 may operate in a networked environment using logical connections to one or more remote computers, such as a remote computer 249. The remote computer 249 may be a server, a router, a peer device or other common network node, and typically includes many or all of the elements described relative to the personal computer 220, although only a memory storage device 250 has been illustrated in FIG. 21. The logical connections depicted in FIG. 21 include a local area network (LAN) 251 and a wide area network (WAN) 252. Such networking environments are commonplace in offices, enterprise-wide computer networks, intranets and the Internet.

When used in a LAN networking environment, the personal computer 220 is connected to the LAN 251 through a network interface 253. When used in a WAN networking environment, the personal computer 220 typically includes a modem 254 or other means for establishing communications over the WAN 252, such as the Internet. The modem 254, which may be internal or external, is connected to the system bus 223 via the serial port interface 246. In a networked environment, program modules depicted relative to the personal computer 220, or portions thereof, may be stored in the remote memory storage device. It will be appreciated that the network connections shown are exemplary and other means of establishing a communications link between the computers may be used.

LNP Embodiment of the Present Invention

Figure 3:
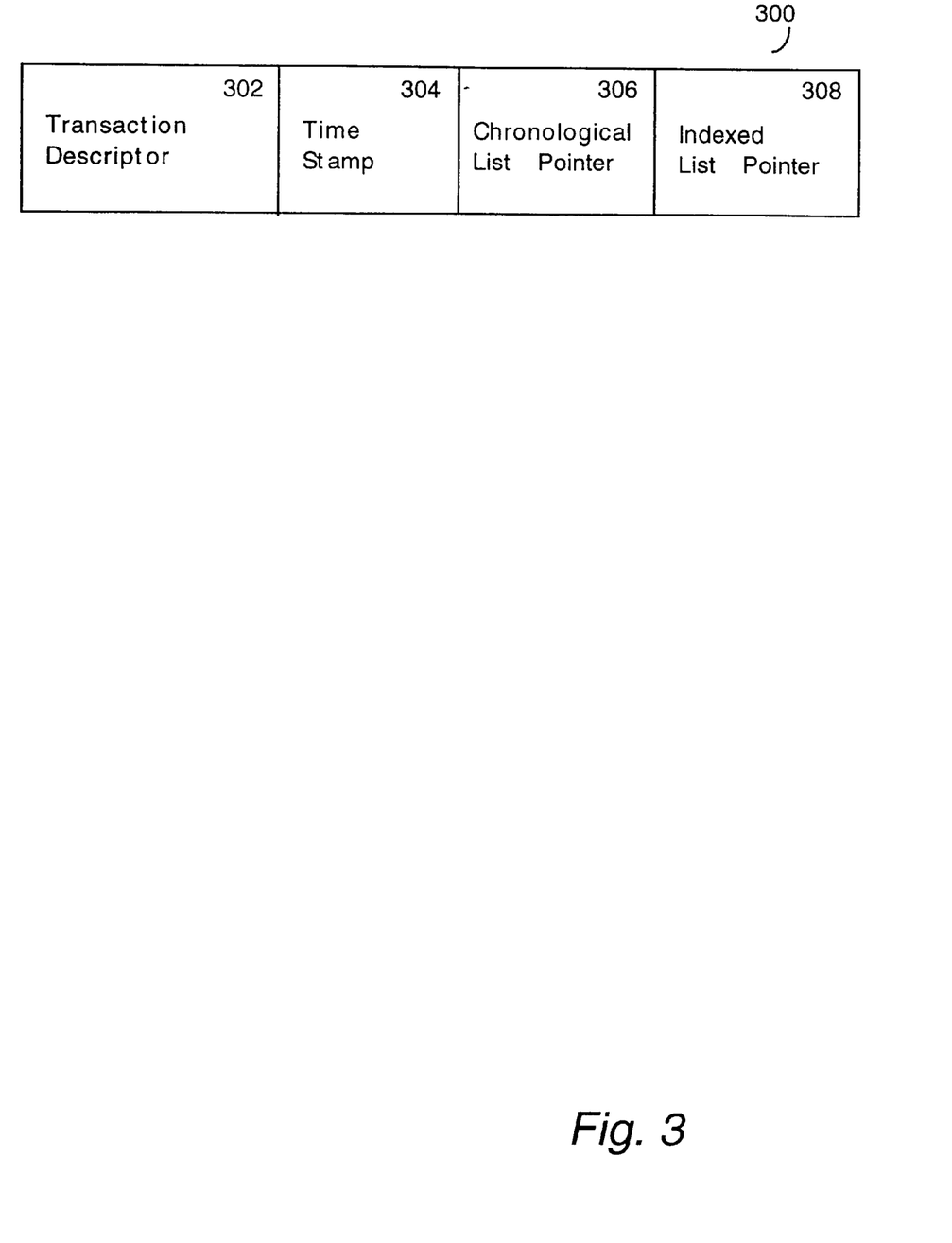
FIG. 3 is an illustration of a transaction entry created by an exemplary embodiment of the present invention.

The present invention is an implementation of transaction ID logging using a chronological list superimposed on an indexed list. One embodiment of the present invention may be used for detecting message looping in an LNP enabled telecommunications network. In the LNP embodiment, a transaction log is comprised of a number of transaction entries, each transaction entry corresponds to a message, such as a TCAP message, sent to another network. An exemplary transaction entry 300 is shown in FIG. 3. Preferably, the transaction entry includes a transaction descriptor field 302, a time stamp field 304, a chronological list pointer field 306 and an indexed list pointer field 308. The transaction descriptor field 302 includes a transaction descriptor which identifies the transaction associated with the message. The transaction descriptor field 302 also includes other information associated with the transaction. In the LNP embodiment, the transaction descriptor may include the TCAP transaction ID, the TCAP message type, the calling party point code from the SCCP header and the TCAP message length. The time stamp field 304 contains a time stamp which indicates the time the message was sent. The chronological list pointer field 306 contains a chronological list pointer to the next entry in the chronological list. The indexed list pointer field 308 contains an indexed list pointer to the next entry with the same index in the indexed list.

The transaction entries are placed in chronological order in the chronological list using chronological list pointers. Preferably, two chronological list pointers, a first chronological list pointer and a last chronological list pointer, keep track of the beginning of the chronological list and the end of the chronological list respectively. The first chronological list pointer identifies the oldest transaction entry in the log and the last chronological list identifies the most recent transaction entry. The order of the intervening transaction entries is maintained by the chronological list pointer fields of the transaction entries.

Figure 4A:
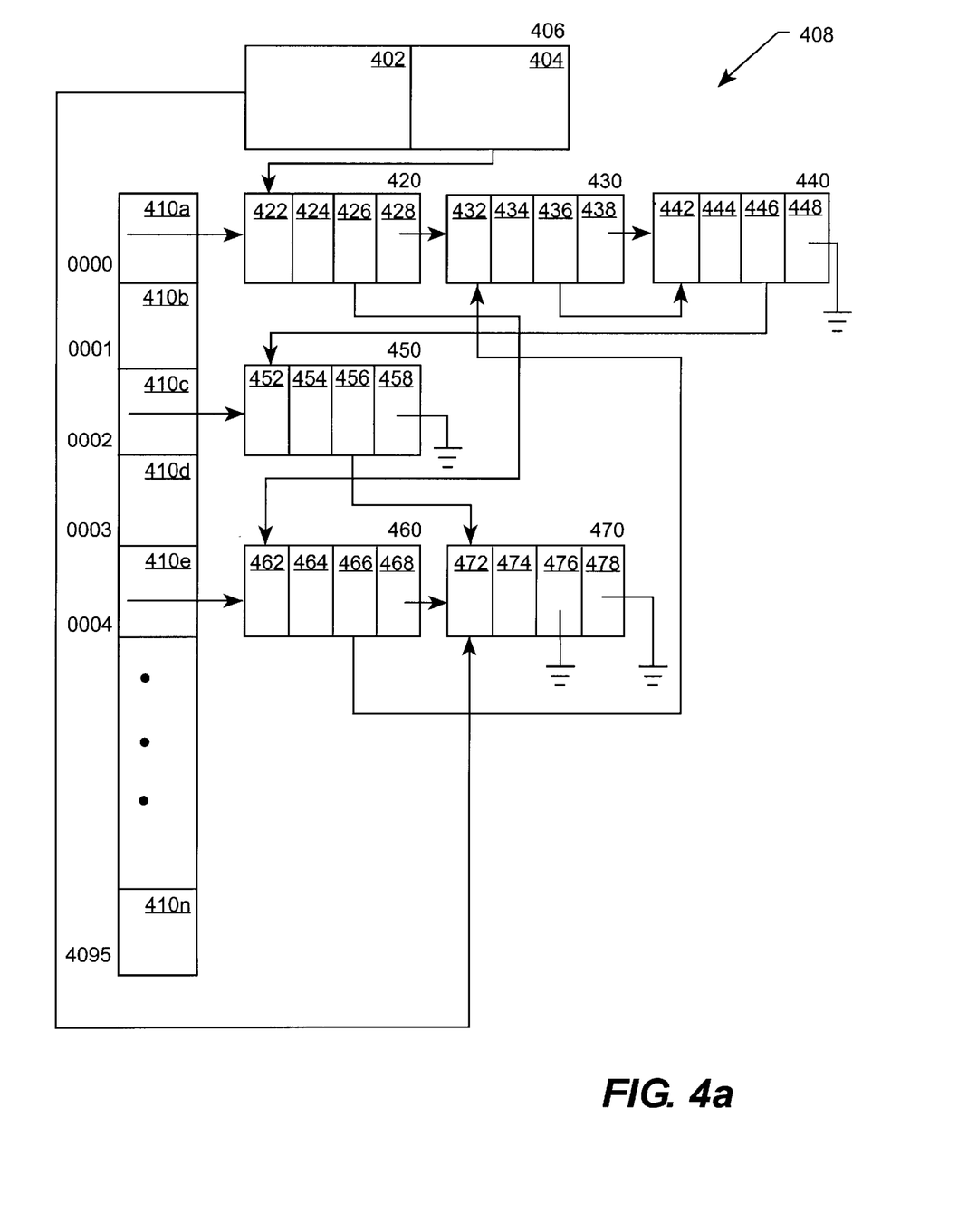
FIG. 4A is an illustration of a transaction log created by an exemplary embodiment of the present invention.

The chronological list 406, illustrated in FIG. 4A, comprises a plurality of chronological pointers 402, 404, 426, 436, 446, 456, 466, and 476. The first chronological list pointer 404 points to the oldest transaction entry 420 in the chronological list and the last chronological list pointer 402 points to the latest transaction entry 470 in the chronological list. The chronological list pointer field of a transaction entry points to the next oldest transaction entry. For example, the oldest transaction entry 420 includes a chronological list pointer field 426 which contains a chronological list pointer to the second oldest transaction entry 460. The second oldest transaction entry 460 includes a chronological list pointer field 466 which contains a chronological list pointer to the third oldest transaction entry 430. The chronological list pointer field for the latest transaction entry 470 contains an end of list indicator in the chronological list pointer field 476. The end of list indicator is illustrated in the figures by "⊥", the null pointer.

The chronological list helps solve the problem of efficiently maintaining the transaction log. The transaction log is maintained by deleting stale transaction entries. Preferably, a stale transaction entry is a transaction entry which has been stored in the transaction log for longer than a predetermined maintenance period. The oldest transaction entries in the transaction log may be quickly and easily identified because the oldest transaction entries are at the front of the chronological list. The first chronological list pointer identifies the oldest transaction entry. The chronological list pointer of the oldest transaction entry identifies the second oldest transaction entry. In an LNP enabled telecommunications network, maintaining the transaction log by purging stale transaction entries insures that a subsequent valid message is not detected as a looping message.

In addition to being placed in a chronological list, the transaction entries are also placed in an indexed list. The indexed list comprises a list of indexed list entry pointers. Each indexed list entry pointer corresponds to an index and points to a transaction entry which corresponds to the same index. A transaction entry corresponds to an index if the transaction descriptor for the transaction entry corresponds to the index. In one implementation of the LNP embodiment, the indexes range from 0000 to 4095. However, the range of the indexes may vary from implementation to implementation. As discussed in more detail below, the lower index is preferably zero and the upper index is preferably defined as ($2^n$–1), where n is an integer.

Preferably, a transaction entry corresponds to an index if the "hashed" transaction descriptor for the transaction entry matches that index. Hashing converts a transaction descriptor into a pseudo random index. The index is not truly random because for any given transaction descriptor, hashing always results in the same pseudo random index. However, the pseudo random indexes produced by hashing are sufficiently random so that the transaction entries are evenly distributed among the indexes. If the implementation uses indexes ranging from 0000 to 4095, then preferably, the transaction descriptor is hashed by calculating the modulo 4096 of the transaction descriptor. The modulo operation is performed by dividing the transaction descriptor by 4096 and returning the remainder of the division operation. The remainder of the division operation is used as an index into the indexed list. The modulo number 4096 is preferred, in part, because the modulo of the transaction descriptor for a transaction entry may be determined by performing a logical AND operation with the transaction descriptor and 4095. As will be apparent to those skilled in the art, if the indexes range from zero to $2^n$–1, then the modulo $2^n$ may be determined by performing a logical AND operation with the transaction descriptor and $2^n$–1.

FIG. 4A also illustrates the indexed list 400. The indexed list 400 comprises a list of indexed list entry pointers 410a, 410b, 410c . . . 410n. Each indexed list entry pointer corresponds to an index. For example, indexed list entry pointer 410a corresponds to 0000 and indexed list entry pointer 410b corresponds to 0001.

Hashing transaction descriptors may result in multiple transaction descriptors having the same index. For example, modulo 4096 of transaction descriptor 1000 and modulo 4096 of transaction descriptor 9192 are both 1000. If there are multiple transaction descriptors with the same index, then all the transaction entries with the same index are linked together via the indexed list pointer fields (e.g. 428 and 438) of the transaction entries. As shown in FIG. 4A, transaction entries 420, 430, and 440 and indexed list entry pointer 410a all correspond to index 0000. Indexed list entry pointer 410a points to transaction entry 420. Transaction entry 420 is linked to transaction entry 430 via its indexed list pointer field 428. Similarly, transaction entry 430 is linked to transaction entry 440 via its indexed list pointer field 438. Since there are no other transaction entries with index 0000, transaction entry 440 contains an end of list indicator in its indexed list pointer field 448.

The indexed list helps solve the problem of quickly searching the transaction log to determine whether a new transaction matches an existing transaction in the transaction log. When a new transaction is received, the transaction descriptor for the new transaction is hashed to determine its index. The index is used to identify an indexed list entry pointer which, in turn, is used to identify transaction entries which correspond to the index. To determine whether there is a match, the transaction information in the transaction descriptor field of the new transaction is compared to the transaction information in the transaction descriptor fields of the transaction entries which correspond to the index. Only the transaction entries which correspond to the index are checked. If the transaction information in the transaction descriptor field of the new transaction matches the transaction information in the transaction descriptor field of an existing transaction, the indexes for the two transaction descriptors will match because hashing always produces the same index for the same input.

A chronological list superimposed on an indexed list, solves the problems of efficiently maintaining and searching the transaction log. The chronological list minimizes the time required to identify the oldest transaction entry. There is no need to search the transaction log to locate the oldest transaction entry because the first chronological list pointer points to the oldest transaction entry. If the oldest transaction entry is stale or if there are no available transaction entries, then the oldest transaction entry may be deleted by modifying the first chronological list pointer and by modifying the indexed list entry pointer associated with the index for the oldest transaction entry. The indexed list minimizes the time required to search the list for transactions which match a new transaction. Only those transaction entries with the same index as the new transaction need be compared.

Figure 4B:
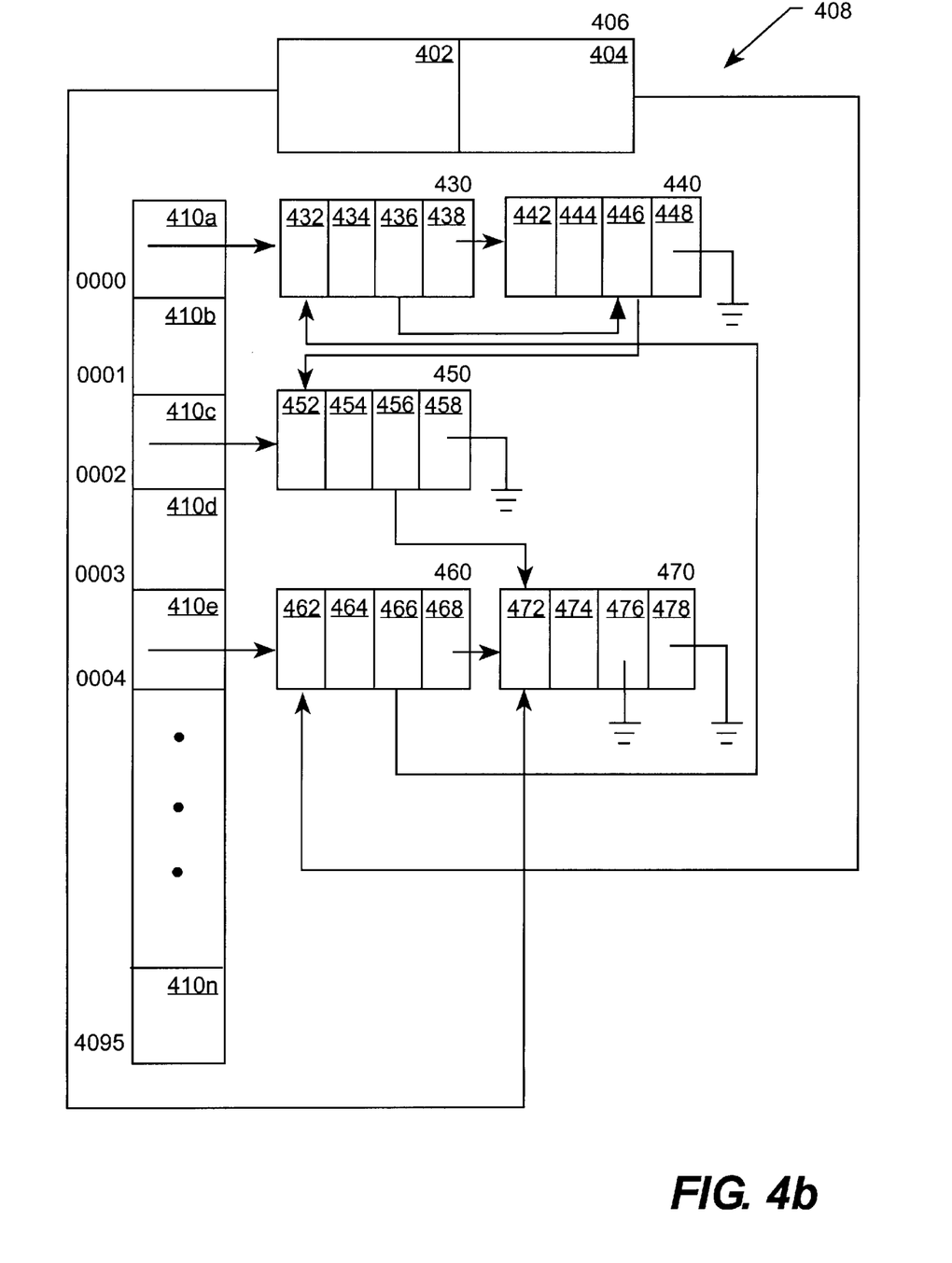
FIG. 4B is an illustration of the transaction log of FIG. 4A after the deletion of a transaction entry by an exemplary embodiment of the present invention.
Figure 5:
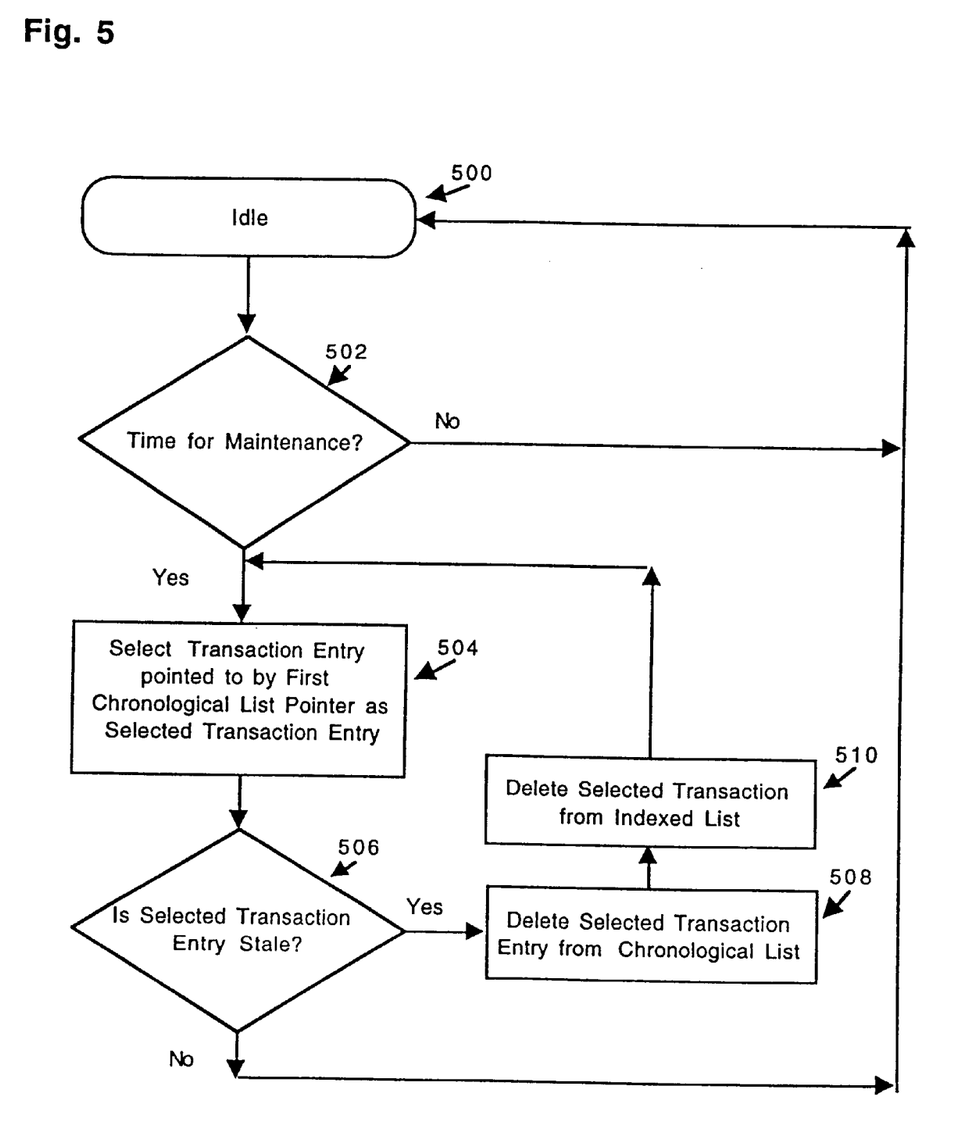
FIG. 5 is a logical flow diagram illustrating the steps for maintaining a transaction log by deleting stale transaction entries in accordance with an exemplary embodiment of the present invention.

The steps for maintaining the transaction log by deleting stale transaction entries may be illustrated by reference to FIGS. 4A, 4B and 5. FIG. 4A illustrates an exemplary transaction log 408 using a chronological list 406 superimposed on an indexed list 400. FIG. 4B illustrates the transaction log of FIG. 4A after a stale transaction entry is purged from the transaction log. FIG. 5 is a logical flow diagram illustrating the steps for deleting a stale transaction entry from the transaction log. FIG. 4A illustrates the transaction log 408 prior to the deletion of any stale transaction entries. The transaction log 408 comprises six transaction entries 420, 430, 440, 450, 460 and 470. The first chronological list pointer 404 points to transaction entry 420 and the last chronological list pointer 402 points to transaction entry 470. The chronological order of the transaction entries is 420, 460, 430, 440, 450 and 470. The indexed list contains indexes from 0000 to 4095. Transaction entries 420, 430, and 440 correspond to index 0000, transaction entry 450 corresponds to index 0002, and transaction entries 460 and 470 correspond to index 0004.

FIG. 5 illustrates the steps for deleting stale transaction entries from the transaction log. Preferably, a transaction is stale if it has been stored in the transaction log for longer than a predetermined maintenance period. Transaction log maintenance may be initiated from an idle state as shown in step 500. Alternatively, transaction log maintenance may be initiated whenever a new transaction is received. In either case, a timer may be used to keep track of the time elapsed since the last maintenance operation was performed and to indicate when the predetermined maintenance period has expired. The timer is checked in step 502 to determine if the predetermined maintenance period has expired. If the timer indicates that the predetermined maintenance period has expired, then the method proceeds to step 504. In step 504, the transaction entry pointed to by the first chronological list pointer is selected as the selected transaction entry. In FIG. 4A, the first chronological list pointer 404 points to transaction entry 420, so transaction entry 420 is selected as the selected transaction entry. Once a transaction entry is selected as the selected transaction entry, the time stamp field 424 of the selected transaction entry 420 is checked in step 506 to determine whether the selected transaction entry is stale. If the time stamp contained in the time stamp field 424 indicates that the selected transaction entry 420 has been stored in the transaction log 408 for longer than the predetermined maintenance period, then the selected transaction entry 420 is deleted from the chronological list 406 in step 508 and from the indexed list 400 in step 510.

To delete the selected transaction entry 420 from the chronological list 406, the first chronological list pointer 404 is modified to point to the next oldest transaction entry 460. Transaction entry 460 is identified as the next oldest transaction entry by the chronological list pointer in the chronological list pointer field 426 of the selected transaction entry 420. The other chronological list pointers remain the same.

The selected transaction entry 420 is also deleted from the indexed list. To delete the selected transaction entry from the indexed list, the index for the selected transaction entry 420 is calculated by hashing all or a predetermined portion of the transaction descriptor. In one implementation of the LNP embodiment, the index is calculated by computing the modulo 4096 of a predetermined portion of the transaction descriptor for the selected transaction entry. In FIG. 4A, the index for the selected transaction entry 420 is 0000. The index is used to identify an indexed list entry pointer 410*a* corresponding to the index. If the indexed list pointer field 428 of the selected transaction entry 420 contains an indexed list pointer to a next transaction entry 430, then the indexed list entry pointer 410*a* is modified to point to the next transaction entry 430. If the indexed list pointer field 428 of the selected transaction entry 420 contains an end of list indicator, then the indexed list entry pointer 410*a* is modified to include an end of list indicator. The other indexed list entry pointers and indexed list pointers remain the same.

The oldest transaction entry for a given index is always pointed to by the indexed list entry pointer because a new transaction entry is always added to the end of the indexed list. Thus, deleting a stale transaction entry from the indexed list, only requires that the indexed list entry pointer be modified. The details of adding a transaction entry to the indexed list are described below.

After the selected transaction entry is deleted, the transaction log appears as shown in FIG. 4B. The transaction log now comprises five transaction entries 430, 440, 450, 460 and 470. The first chronological list pointer points to transaction entry 460 and the last chronological list pointer points to transaction entry 470. The chronological order of the transaction entries is 460, 430, 440, 450 and 470. Transaction entries 430 and 440 correspond to index 0000, transaction entry 450 corresponds to index 0002, and transaction entries 460 and 470 correspond to index 0004.

Preferably, if the selected transaction entry is deleted, then the next oldest transaction entry is checked to determine whether it is also stale. FIG. 5 shows that step 504 of selecting a transaction entry as the selected transaction entry, step 506 of making a determination as to whether the selected transaction entry is stale, step 508 of deleting the selected transaction entry from the chronological list and step 510 of deleting the selected transaction entry from the indexed list are repeated until the determination in step 506 is that the selected transaction entry is not stale. By using the first chronological list pointer to select the selected transaction entry, once a determination is made that the selected transaction entry is not stale, no other transaction entries are checked because the remaining transaction entries have been stored in the transaction log for lesser periods of time.

If the determination in step 506 is that the selected transaction entry is not stale or if the determination in step 502 is that the predetermined maintenance period has not expired, then the method returns to the idle state of step 500. Alternatively, if transaction log maintenance was initiated by the receipt of a new transaction, the method proceeds with the steps for handling a new transaction.

Figure 4C:
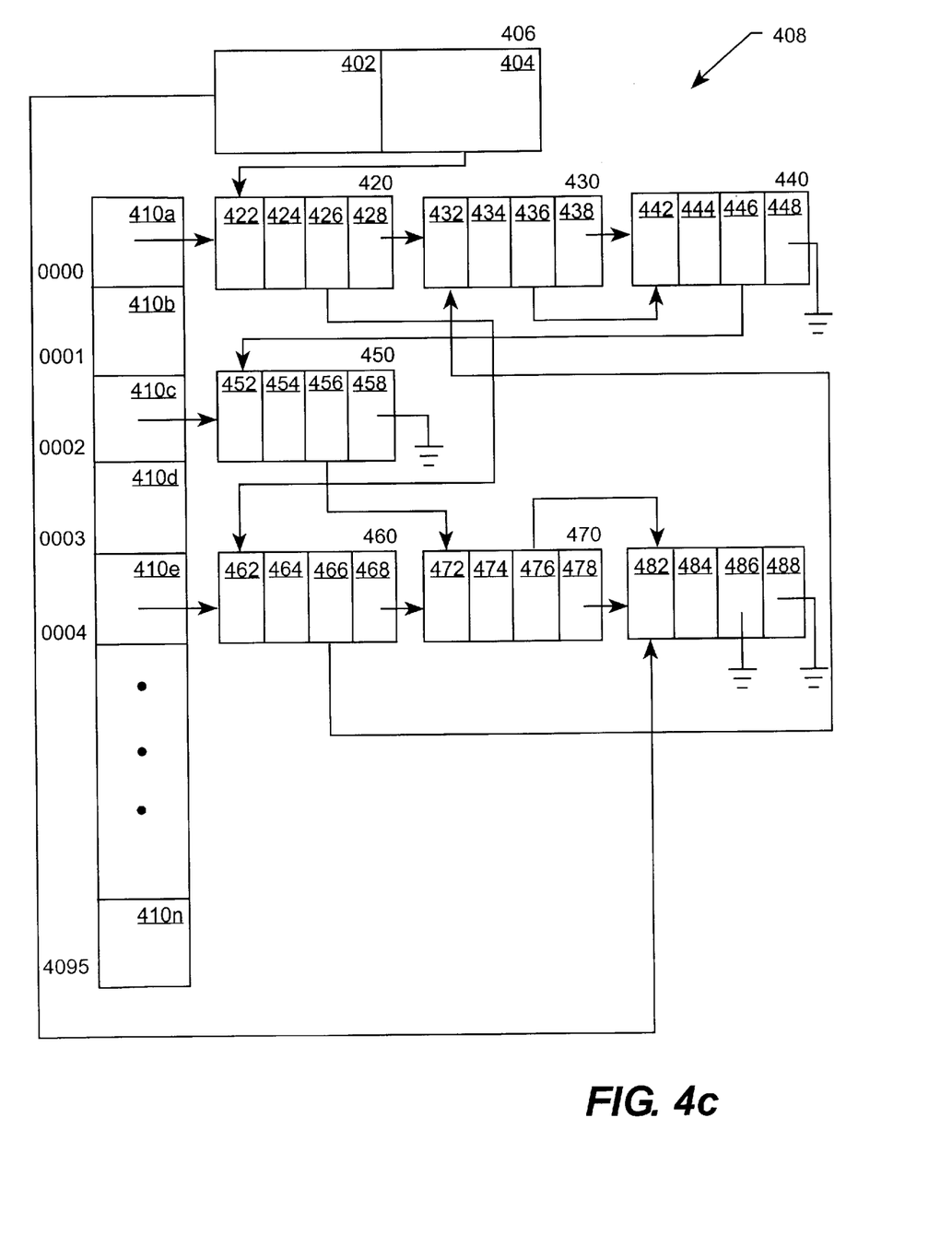
FIG. 4C is an illustration of a transaction log of FIG. 4A after the addition of a transaction entry by an exemplary embodiment of the present invention.
Figure 6A:
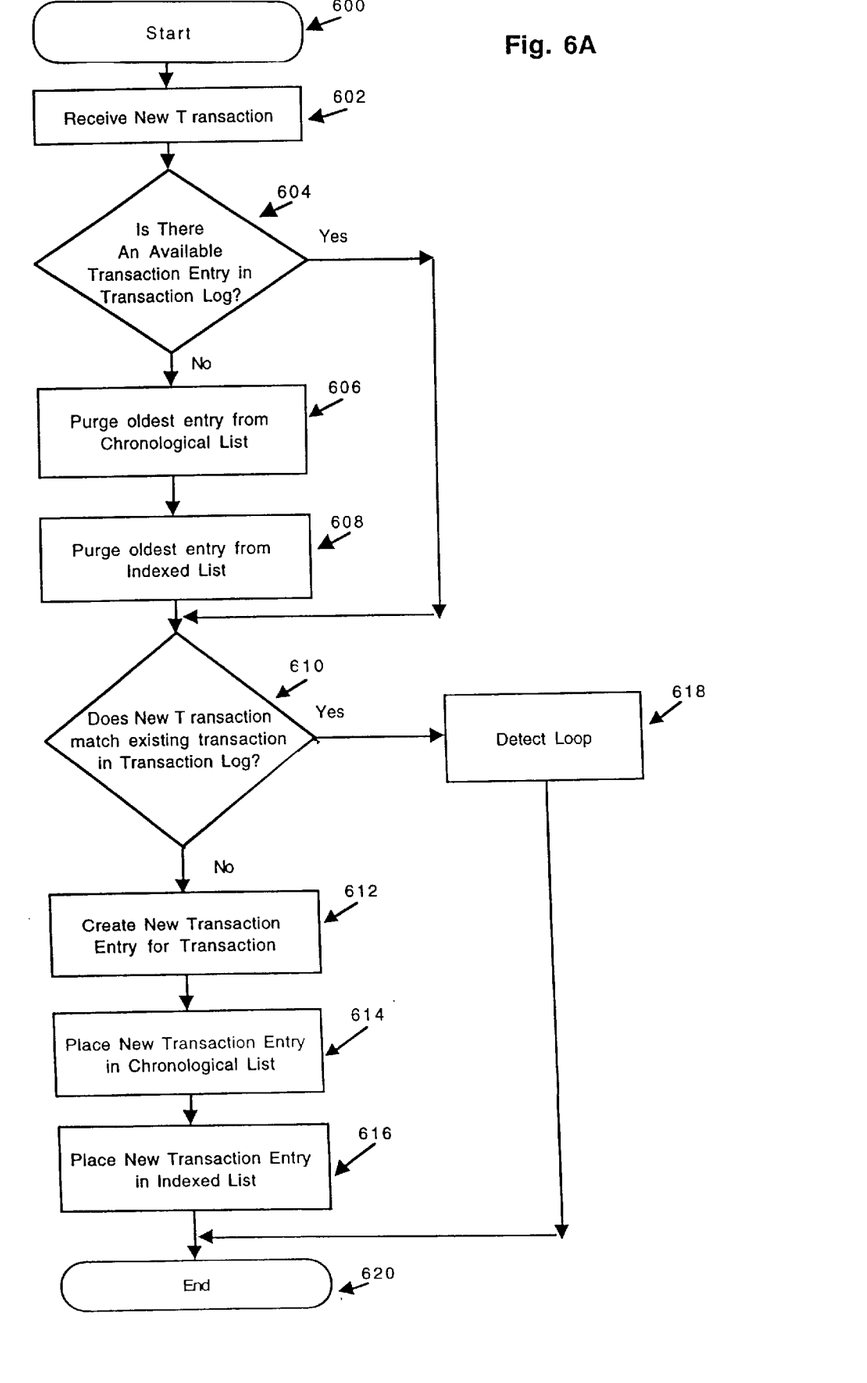
FIG. 6A is a logical flow diagram illustrating the steps for adding a transaction entry to a transaction log in accordance with an exemplary embodiment of the present invention.
Figure 6B:
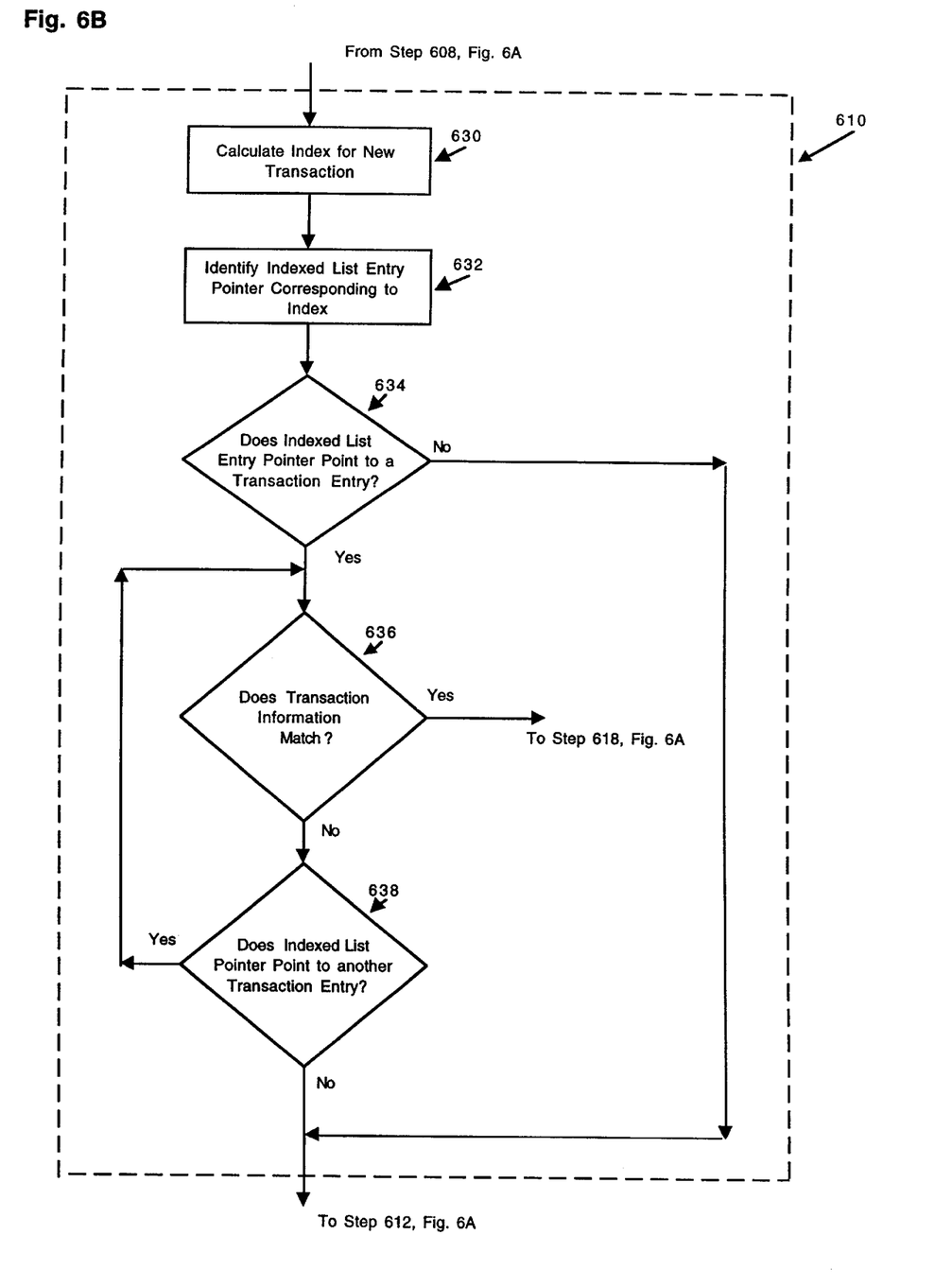
FIG. 6B is a logical flow diagram illustrating the steps for comparing a transaction to the existing transactions in a transaction log in accordance with an exemplary embodiment of the present invention.

The steps for handling a new transaction may be illustrated by reference to FIGS. 4A, 4C, 6A and 6B. FIG. 4A illustrates an exemplary transaction log 408 using a chronological list 406 superimposed on an indexed list 400. FIG. 4C illustrates the transaction log of FIG. 4A after a new transaction entry is added to the transaction log. FIG. 6A is a logical flow diagram illustrating the steps for adding a new transaction entry to the transaction log. FIG. 6B is a logical flow diagram illustrating the steps for making a determination as to whether a new transaction matches an existing transaction in the transaction log.

FIG. 4A illustrates the transaction log 408 before the new transaction is received. The steps for adding a new transaction to the transaction log begin at the START task of step 600 of FIG. 6A. In step 602, a new transaction is received. In step 604, a determination is made as to whether there is an available transaction entry in the transaction log for a new transaction entry. If there is an available transaction entry for the new transaction, then the method proceeds to step 610 where a determination is made as to whether the new transaction matches an existing transaction in the transaction log.

The steps for making a determination as to whether the new transaction matches an existing transaction in the transaction log are illustrated in FIG. 6B. In FIG. 6B, the index for the new transaction is calculated in step 630 by hashing the transaction descriptor. In the LNP embodiment illustrated by FIG. 4A, the index is calculated by taking the modulo 4096 of the transaction descriptor for the new transaction. For example, if the transaction descriptor for the new transaction is 0004, the index for the new transaction is hashed by calculating modulo 4096 of 0004 which is 0004. Once the index for the new transaction is calculated, the indexed list entry pointer corresponding to the index is identified in step 632. If the index is 0004, then, as shown in FIG. 4A, the indexed list entry pointer 410*e* is identified. In step 634, a determination is made as to whether the indexed list entry pointer contains a pointer to a transaction entry. If the indexed list entry pointer does not contain a pointer to a transaction entry, then the determination is that the transaction does not match an existing transaction in the transaction log and the method continues to step 612. If the indexed list entry pointer contains a pointer to a transaction entry, then the transaction information for the existing transaction entry is compared to the transaction information for the new transaction in step 636. In FIG. 4A, the indexed list entry pointer 410e points to transaction entry 460 so the transaction information for existing transaction entry 460 is compared to the transaction information for the new transaction.

If the transaction information for the existing transaction entry matches the transaction information for the new transaction, then a loop is detected and the method proceeds to step 618 of FIG. 6A. In response to detecting a loop, the network takes some action which may include closing the transaction which originated the message or resending the message. Alternatively, if the transaction information for the existing transaction entry does not match the transaction information for the new transaction, then the method proceeds to step 638. In this example, the transaction information for the existing transaction entry 460 does not match the transaction information for the new transaction so the method proceeds to step 638. In step 638, a determination is made as to whether the indexed list pointer field of the transaction entry points to another transaction entry. If the indexed list pointer field of the transaction entry points to another transaction entry, then the method returns to step 636. In FIG. 4A, the indexed list pointer field 468 of transaction entry 460 points to transaction entry 470, so step 636 is repeated with transaction entry 470. In this example, the determination in step 636 is that the transaction information for transaction 470 does not match the transaction information for the new transaction so the method proceeds to step 638. If the determination in step 638 is that the indexed list pointer field of the transaction entry does not point to another transaction entry, then the method proceeds to step 612 of FIG. 6A. The determination in step 638 for transaction entry 470 is that the indexed list pointer field 478 of the transaction entry 470 does not point to another transaction entry so the method proceeds to step 612 of FIG. 6A.

The transaction is added to the transaction log in steps 612–616. In step 612, a new transaction entry for the transaction is created. The new transaction entry contains a transaction descriptor field, a time stamp field, a chronological list pointer field and an indexed list pointer field. In the LNP embodiment, the transaction descriptor field preferably contains a portion of the SS7 header and the time stamp field contains a time indicating when the message associated with the new transaction occurred. The new transaction entry 480 includes a transaction descriptor field 482, a time stamp field 484, a chronological list pointer field 486 and an indexed list pointer field 488 and is shown in FIG. 4C. The new transaction entry is placed in the chronological list in step 614.

To place the new transaction entry in the chronological list, the last chronological list pointer is updated to point to the new transaction entry. The chronological list pointer field for the transaction entry previously pointed to by the last chronological list pointer is also updated to point to the new transaction entry. In FIG. 4C, the last chronological list pointer 402 is updated to point to the new transaction entry 480 and the last chronological list pointer field 476 for the transaction entry 470 previously pointed to by the last chronological list pointer is updated to point to the new transaction entry 480. The chronological list pointer field 486 for the new transaction entry 480 contains an end of list indicator.

To place the new transaction entry in the indexed list, the new transaction entry is placed at the end of the list of transaction entries with the same index. By placing the new transaction entry at the end of the list of transaction entries with the same index, the oldest transaction entry for a given index is always pointed to by the indexed list entry pointer. The transaction entries with the same index were previously identified in step 610 where a determination was made as to whether the new transaction matches an existing transaction in the transaction log. In the example of FIG. 4C, transaction entries 460 and 470 correspond to the same index as the transaction. The new transaction entry is added after transaction entry 470 by modifying the indexed list pointer field 478 of transaction entry 470 to point to the new transaction entry 480. The indexed list pointer field of the new transaction entry contains an end of list indicator. Alternatively, if the indexed list entry pointer for the index corresponding to the new transaction entry contains an end of list indicator, then in step 616, the indexed list entry pointer is updated to point to the new transaction entry.

The transaction log after the new transaction entry is added is shown in FIG. 4C. The transaction log now comprises seven transaction entries 420, 430, 440, 450, 460, 470 and 480. The first chronological list pointer points to transaction entry 420 and the last chronological list pointer points to transaction entry 480. The chronological order of the transaction entries is 420, 460, 430, 440, 450, 470 and 480. Transaction entries 420, 430, and 440 correspond to index 0000, transaction entry 450 corresponds to index 0002, and transaction entries 460, 470 and 480 correspond to index 0004.

If a transaction entry is not available in the transaction log when a transaction is received, then the oldest transaction entry is purged from the transaction log. The steps of making a transaction entry available for a newly received transaction are shown in FIG. 6A. The transaction is received in step 602. In step 604, a determination is made as to whether there is an available transaction entry in the transaction log. If a transaction entry is not available, then the oldest transaction entry is purged from the chronological list in step 606 and is purged from the indexed list in step 608. Purging the oldest transaction entry from the chronological list and the indexed list follows the steps described above in connection with maintaining the transaction log.

The present invention is directed toward a system and method for logging transactions in a transaction log using a chronological list superimposed on an indexed list. The chronological list is used to identify and delete stale transaction entries. The time needed to identify and delete stale transaction entries is minimized because the oldest transaction entry is at the beginning of the chronological list and is at the beginning of the list pointed to by the indexed list entry pointer corresponding to the index for the oldest transaction entry.

The indexed list is used to compare a new transaction to the existing transactions in the transaction log to determine whether the new transaction matches an existing transaction. The new transaction is only compared to transaction entries with the same index as the new transaction. The time to determine whether the new transaction matches an existing transaction is minimized by limiting the number of transaction entries compared to only those transaction entries with the same index as the new transaction.

In one embodiment, the present invention may be used to implement transaction ID logging to detect non-call associated message looping in an LNP enabled telecommunications network. The use of a chronological list superimposed on an indexed list implements transaction ID logging without adversely impacting network performance. Other embodiments may be used to log other types of transactions or data.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is described by the appended claims and is supported by the foregoing description.

What is claimed is:

1. A method for recording transactions in a transaction log comprising a plurality of transaction entries using a chronological list superimposed on an indexed list, the chronological list orders the transaction entries according to when the corresponding transactions occurred and the indexed list orders the transaction entries according to indexes corresponding to the transaction entries, the transaction log including a first chronological list pointer that points to an oldest transaction entry in the chronological list, comprising the steps of:

receiving a new transaction;

determining whether the new transaction matches any of the transaction entries in the transaction log;

if the new transaction does not match any of the transaction entries, then creating a new transaction entry for the transaction;

placing the new transaction entry in the chronological list; and placing the new transaction entry in the indexed list.

2. The method of claim 1, wherein the step of creating a new transaction entry for the transaction comprises:

creating a transaction descriptor field comprising a transaction descriptor for identifying the transaction;

creating a time stamp field comprising a time identifier for indicating a time when the transaction occurred;

creating a chronological list pointer field comprising a chronological list pointer for identifying a subsequent transaction entry corresponding to a transaction received after the new transaction; and creating an indexed list pointer field containing an indexed list pointer for identifying a next transaction entry corresponding to the same index as the new transaction entry.

3. The method of claim 1, wherein the chronological list comprises a latest transaction entry and a last chronological list pointer, the latest transaction entry corresponds to a transaction received prior to the new transaction and comprises a chronological list pointer field, and the last chronological list pointer points to the latest transaction entry, and wherein the step of placing the new transaction entry in the chronological list comprises the steps of:

updating the chronological list pointer field for the latest transaction entry to point to the new transaction entry; and updating the last chronological list pointer to point to the new transaction entry.

4. The method of claim 1, wherein the indexed list comprises a plurality of indexed list entry pointers, each indexed list entry pointer corresponding to an index, and wherein the step of placing the new transaction entry in the indexed list comprises the steps of:

determining an index for the new transaction entry; and updating the indexed list entry pointer corresponding to the index for the new transaction entry to point to the new transaction entry.

5. The method of claim 1, wherein the indexed list comprises a first indexed list entry pointer corresponding to a first index and pointing to a first transaction entry, and the first transaction entry comprises an indexed list pointer field, and wherein the step of placing the new transaction entry in the indexed list comprises the steps of:

determining an index for the new transaction entry; and if the index for the new transaction entry is equal to the first index, then updating the indexed list pointer field of the first transaction entry to point to the new transaction entry.

6. The method of claim 1, wherein the indexed list comprises a plurality of indexed list entry pointers, each indexed list entry pointer corresponding to an index, wherein the step of determining whether the new transaction matches any of the transaction entries in the transaction log, comprises:

calculating an index for the new transaction; and comparing the transaction descriptor field for the new transaction with a transaction descriptor field for a transaction entry pointed to by an indexed list entry pointer corresponding to the index for the new transaction.

7. The method of claim 1, further comprising the step of:

if the new transaction matches one of the transaction entries, then detecting a looping transaction.

8. A method for recording transactions in a transaction log using a chronological list superimposed on an indexed list, wherein the transaction log comprises a plurality of transaction entries, the chronological list orders the transaction entries from an oldest transaction entry to a latest transaction entry and the indexed list orders the transaction entries according to indexes corresponding to transaction descriptors for the messages, the transaction log including a first chronological list pointer that points to an oldest transaction entry in the chronological list, comprising the steps of:

receiving a transaction;

making a determination as to whether there is an available transaction entry in the transaction log;

if the determination is that there is no available transaction entry, then deleting a transaction entry corresponding to the oldest transaction entry from the transaction log using the first chronological list pointer;

creating a new transaction entry for the message; and placing the new transaction entry in the transaction log.

9. The method of claim 1, wherein the step of deleting a transaction entry corresponding to the oldest transaction entry, comprises:

using the first chronological list pointer to identify the oldest transaction entry;

deleting the oldest transaction entry from the chronological list by updating the first chronological list pointer to point to a second oldest transaction entry; and deleting the oldest transaction entry from the indexed list by updating an indexed list entry pointer that corresponds to the oldest transaction entry to contain an end of list indicator.

10. The method of claim 8, further comprising the step of:

making a determination as to whether the new transaction matches any of the transaction entries in the transaction log by:

determining an index for the new transaction;

using the index to select an index list entry pointer;

using the selected index list entry pointer to identify a selected transaction entry; and comparing the selected transaction entry to the new transaction.

* * * * *

UNITED STATES PATENT AND TRADEMARK OFFICE
CERTIFICATE OF CORRECTION

PATENT NO. : 6,286,011 B1  
DATED : September 4, 2001  
INVENTOR(S) : Velamuri et al.

Page 1 of 1

It is certified that error appears in the above-identified patent and that said Letters Patent is hereby corrected as shown below:

<u>Column 17,</u>
Line 10, delete "tog" and insert -- log --

<u>Column 18,</u>
Line 43, delete "claim 1" and insert -- claim 8 --

Signed and Sealed this

Fourteenth Day of May, 2002

Attest:

JAMES E. ROGAN
*Attesting Officer*     *Director of the United States Patent and Trademark Office*